(No Model.)
S. V. HENKELS.
RIVET.
No. 437,434. Patented Sept. 30, 1890.
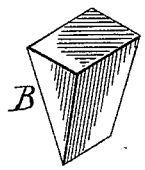
FIG. 1.
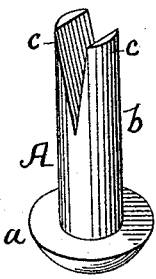
FIG. 2.
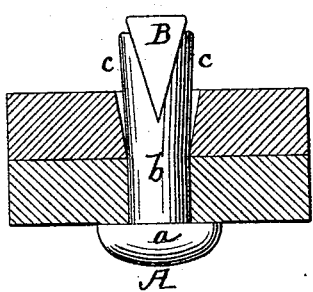
FIG. 3.
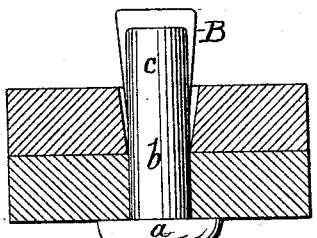
FIG. 4.
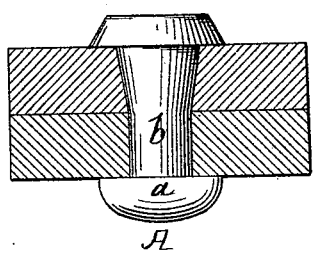
Witnesses:
R. Schleicher.
Murray C. Boyer.
Inventor:
Stanislaus V. Henkels
by his Attorneys
Howson & Howson

UNITED STATES PATENT OFFICE.

STANISLAUS V. HENKELS, OF PHILADELPHIA, PENNSYLVANIA, ASSIGNOR OF ONE-HALF TO WILLIAM H. WRIGHT, OF SAME PLACE.

RIVET.

SPECIFICATION forming part of Letters Patent No. 437,434, dated September 30, 1890.

Application filed June 16, 1890. Serial No. 355,618. (No model.)

*To all whom it may concern:*

Be it known that I, STANISLAUS V. HENKELS, a citizen of the United States, and a resident of Philadelphia, Pennsylvania, have invented certain Improvements in Rivets, of which the following is a specification.

The object of my invention is to form a rivet made in two parts, so that the orifice into which it is inserted will be entirely filled up when the rivet is compressed. This object I attain in the following manner, reference being had to the accompanying drawings, in which—

Figure 1 is a perspective view showing the two parts of the rivet detached. Fig. 2 is a view showing the end of the wedge-shaped portion. Fig. 3 is a view of the rivet, showing the side of the wedge-shaped portion; and Fig. 4 is a view of the rivet flattened down and completed.

I have found that in the using of the ordinary single rivet the orifice through which the rivet is passed is oftentimes not filled up, and consequently the plate becomes loose and in time cuts away the rivet, and leakage often occurs through this defect. The object of my invention is to obviate this objection.

Referring to the drawings, A is the main portion of the rivet, composed of the shank $b$ and the head $a$. The shank is grooved, forming two tapered arms $c$ $c$, as clearly shown in Fig. 1, and adapted to the V-shaped groove is a wedge-shaped block B, which is a trifle wider at the head than the shank $b$. The two parts of the rivet are first heated in the ordinary manner to a welding heat. The portion A is passed through the openings in the plates to be riveted, as shown in Fig. 2, and the portion B is then placed in the V-shaped groove of the portion A, as shown, after which the usual method of riveting is resorted to, compressing the material forming the shank and the block, and welding the same, so that the rivet becomes a unit.

The holes in the plates being entirely filled, I prefer to make either one or both the holes tapered, as shown, so that even if the formed head of the rivet is cut off it will be impossible to remove the balance of the rivet without first cutting off the head A.

This rivet is especially applicable for use in vault structures and jails and like places.

I claim as my invention—

1. A rivet comprising a shank split or grooved at one end and having a head at the other end, and a block entering the split end of the shank, and adapted during the riveting operation to be welded to the shank and form the opposite head of the rivet, substantially as specified.

2. A rivet comprising a shank split at one end to form a wedge-shaped recess and having a head at the opposite end, and a wedge-shaped block adapted to fit the recess formed by the split end of the shank, substantially as specified.

In testimony whereof I have signed my name to this specification in the presence of two subscribing witnesses.

STANISLAUS V. HENKELS.

Witnesses:
HENRY HOWSON,
HARRY SMITH.